United States Patent
Fujiwara et al.

(10) Patent No.: US 10,288,876 B2
(45) Date of Patent: May 14, 2019

(54) OPTICAL SCANNING ACTUATOR AND OPTICAL SCANNING APPARATUS

(71) Applicant: OLYMPUS CORPORATION, Tokyo (JP)

(72) Inventors: Masato Fujiwara, Tokyo (JP); Morimichi Shimizu, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/596,051

(22) Filed: May 16, 2017

(65) Prior Publication Data

US 2017/0248784 A1  Aug. 31, 2017

Related U.S. Application Data

(63) Continuation of application No. PCT/JP2014/005792, filed on Nov. 18, 2014.

(51) Int. Cl.
*G02B 26/10* (2006.01)
*G02B 23/24* (2006.01)
*G02B 23/26* (2006.01)

(52) U.S. Cl.
CPC ....... *G02B 26/103* (2013.01); *G02B 23/2469* (2013.01); *G02B 23/26* (2013.01)

(58) Field of Classification Search
CPC .. G02B 26/10; G02B 23/24; G02B 23/60006; G02B 6/0008; G02B 6/4298; G02B 6/0006; G02B 23/2469; G02B 26/103
USPC ......................................................... 362/581
See application file for complete search history.

(56) References Cited

U.S. PATENT DOCUMENTS

| | | | |
|---|---|---|---|
| 6,597,085 B2 * | 7/2003 | Lee | H01L 41/107 310/359 |
| 6,672,739 B1 | 1/2004 | Argyle et al. | |
| 6,856,712 B2 * | 2/2005 | Fauver | G02B 6/241 385/12 |

(Continued)

FOREIGN PATENT DOCUMENTS

| | | |
|---|---|---|
| CN | 104144632 A | 11/2014 |
| JP | S55-61120 A | 5/1980 |

(Continued)

OTHER PUBLICATIONS

English translation of International Preliminary Report on Patentability dated Jun. 1, 2017 together with the Written Opinion received in related International Application No. PCT/JP2014/005792.

(Continued)

*Primary Examiner* — Robert J May
(74) *Attorney, Agent, or Firm* — Scully, Scott, Murphy & Presser, P.C.

(57) ABSTRACT

This optical scanning actuator can improve yield and assembly efficiency. An optical scanning actuator (10) includes a piezoelectric element (14) that is joined to a displaceably supported emission end (11a) of an optical fiber (11) and displaces the emission end (11a) in a direction perpendicular to an optical axis direction of the optical fiber (11) by expanding and contracting in the optical axis direction. The piezoelectric element (14) includes an identifier (16) for identifying a polarization direction, the identifier (16) being formed physically.

8 Claims, 9 Drawing Sheets

(56) References Cited

U.S. PATENT DOCUMENTS

| | | | | |
|---|---|---|---|---|
| 7,158,234 | B2* | 1/2007 | Uchiyama | A61B 1/0008 |
| | | | | 356/479 |
| 8,274,733 | B2* | 9/2012 | Noguchi | G06E 1/00 |
| | | | | 359/344 |
| 9,285,582 | B2* | 3/2016 | Ito | G02B 23/26 |
| 9,581,810 | B2* | 2/2017 | Aga | G02B 26/0858 |

FOREIGN PATENT DOCUMENTS

| | | |
|---|---|---|
| JP | H10-136665 A | 5/1998 |
| JP | 2002-084008 A | 3/2002 |
| JP | 2008-245510 A | 10/2008 |
| JP | 2013-244045 A | 12/2013 |
| JP | 2014-137565 A | 7/2014 |

OTHER PUBLICATIONS

International Search Report dated Dec. 22, 2014 issued in PCT/JP2014/005792.

Japanese Notification of Reasons for Refusal dated Sep. 11, 2018 received in Japanese Patent Application No. 2016-559693, together with an English-language translation.

Chinese Office Action dated Dec. 3, 2018 received in Chinese Application No. 201480083447.8, together with an English-language translation.

\* cited by examiner

OPTICAL SCANNING ACTUATOR AND OPTICAL SCANNING APPARATUS

CROSS REFERENCE TO RELATED APPLICATIONS

The present application is a Continuing Application based on International Application PCT/JP2014/005792 filed on Nov. 18, 2014, the entire disclosures of which is incorporated herein by reference.

TECHNICAL FIELD

The present disclosure relates to an optical scanning actuator and to an optical scanning apparatus using the optical scanning actuator.

BACKGROUND

Conventionally, a known optical scanning apparatus scans an object of observation by irradiating light towards the object of observation from an optical fiber while displacing the emission end of the optical fiber and detects light that is reflected, scattered, or the like by the object of observation, fluorescent light generated on the object of observation, and the like (for example, see JP 2013-244045 A (PTL 1)).

The optical scanning apparatus disclosed in PTL 1 is provided with an optical scanning actuator that displaces the emission end of the optical fiber. The optical scanning actuator for example includes a ferrule and piezoelectric elements mounted on the side surfaces of the ferrule. The ferrule has a quadrangular prism shape and holds the emission end of the optical fiber, which passes through the ferrule.

CITATION LIST

Patent Literature

PTL 1: JP 2013-244045 A

SUMMARY

To this end, an optical scanning actuator according to the present disclosure includes a piezoelectric element joined to a displaceably supported emission end of an optical fiber and configured to displace the emission end in a direction perpendicular to an optical axis direction of the optical fiber by expanding and contracting in the optical axis direction;

such that the piezoelectric element comprises an identifier for identifying a polarization direction, the identifier being formed physically.

The identifier may be formed by a cutout portion.

The piezoelectric element may have an elongated shape in the optical axis direction of the optical fiber; and the identifier may be formed towards an emission end face of the optical fiber.

The piezoelectric element may be mounted on a side of a ferrule holding the optical fiber.

The piezoelectric element may be mounted on the emission end of the optical fiber.

An optical scanning apparatus according to the present disclosure includes:

an optical fiber with a displaceably supported emission end;

the aforementioned optical scanning actuator, which displaces the emission end;

an optical input interface configured to cause illumination light from a light source to enter the optical fiber; and an illumination optical system configured to irradiate the illumination light emitted from an emission end face of the optical fiber onto an object;

such that the optical scanning apparatus performs a scan by controlling voltage applied to the piezoelectric element so that the illumination light irradiated onto the object traces a desired scanning trajectory.

DETAILED DESCRIPTION

The following describes embodiments of the present disclosure with reference to the drawings.

Embodiment 1

Figure 1A:
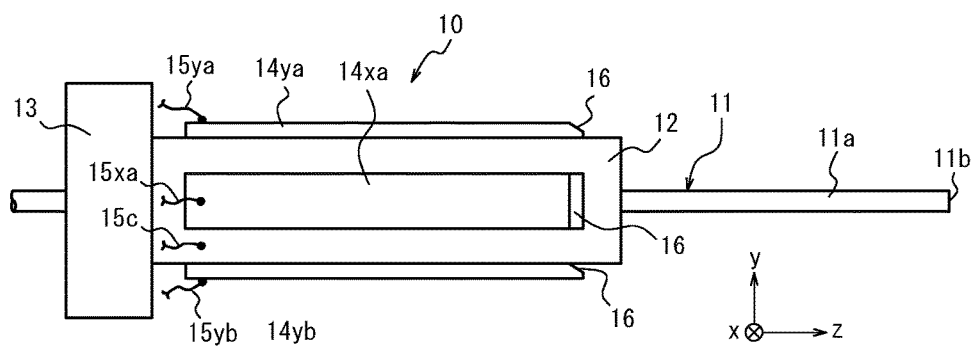
FIG. 1A schematically illustrates the configuration of the main part of an optical scanning actuator according to Embodiment 1.

FIG. 1A schematically illustrates the configuration of the main part of an optical scanning actuator according to Embodiment 1. The optical scanning actuator 10 according to this embodiment includes a ferrule 12. The ferrule holds an emission end 11a of an optical fiber 11, which passes through the ferrule 12. The optical fiber 11 is adhered to the ferrule 12. The end of the ferrule 12 opposite from an emission end face 11b of the optical fiber 11 is joined to a support 13 so that the ferrule 12 is supported at one end by the support 13 to allow oscillation. The optical fiber 11 extends through the support 13.

Figure 1B:
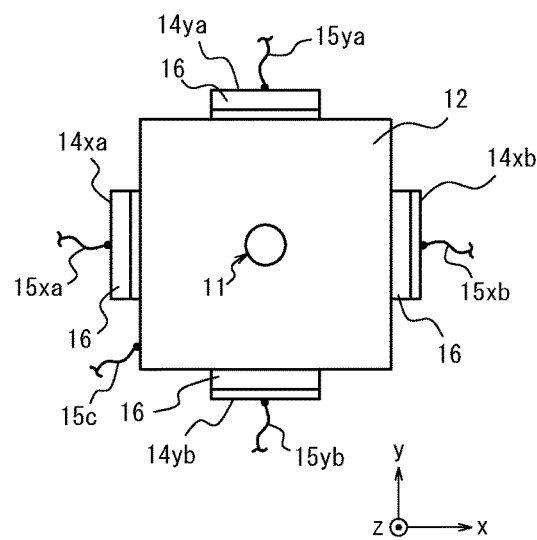
FIG. 1B is an expanded view of the optical scanning actuator in FIG. 1A looking towards the emission end face of the optical fiber.

FIG. 1B is an expanded view of the optical scanning actuator 10 in FIG. 1A as seen from the emission end side of the optical fiber 11. The ferrule 12 is, for example, made of a metal such as nickel. The ferrule 12 may be formed in any shape, such as a quadrangular prism or a cylinder. This embodiment shows an example of the ferrule 12 having a quadrangular prism shape. Piezoelectric elements 14*xa*, 14*xb* and 14*ya*, 14*yb* are mounted on the ferrule 12 by adhesive or the like on sides that oppose each other in the x-direction and the y-direction, where the x-direction and y-direction are orthogonal to each other in a plane orthogonal to the z-direction, and the z-direction is a direction parallel to the optical axis direction of the optical fiber 11. In other words, piezoelectric elements 14*xa*, 14*xb* and 14*ya*, 14*yb* are joined to the emission end 11*a* of the optical fiber 11 via the ferrule 12. In the following explanation, the piezoelectric elements 14*xa*, 14*xb* and 14*ya*, 14*yb* are abbreviated as piezoelectric element(s) 14 unless otherwise specified. The piezoelectric elements 14 are rectangular, with the long sides in the z-direction. Each piezoelectric element 14 has an electrode formed on both surfaces in the thickness direction. Each piezoelectric element 14 is configured to be capable of expanding and contracting in the z-direction upon voltage being applied in the thickness direction via the opposing electrodes.

On the piezoelectric elements 14, corresponding lead wires 15*xa*, 15*xb* and 15*ya*, 15*yb* are connected to the electrode surface on the opposite side from the electrode surface adhered to the ferrule 12. Also, a lead wire 15*c* is connected to the ferrule 12 that serves as a common electrode for the piezoelectric elements 14. To the piezoelectric elements 14*xa*, 14*xb*, for example in-phase alternating voltage for x-driving that gradually increases in amplitude is applied via the lead wires 15*c*, 15*xa*, and 15*xb*. To the piezoelectric elements 14*ya*, 14*yb*, for example in-phase alternating voltage for y-driving that gradually increases in amplitude and whose phase differs by 90° from the alternating voltage for x-driving is applied via the lead wires 15*c*, 15*ya*, and 15*yb*. As a result, when one of the piezoelectric elements 14*xa*, 14*xb* expands, the other contracts, causing the ferrule 12 to vibrate by bending in the x-direction. Similarly, when one of the piezoelectric elements 14*ya*, 14*yb* expands, the other contracts, causing the ferrule 12 to vibrate by bending in the y-direction. As a result, the emission end 11*a* of the optical fiber 11 is deflected in a spiral yielded by combining vibration in the x-direction and in the y-direction. Accordingly, upon causing illumination light to enter the optical fiber 11, the object of observation can be scanned in a spiral shape by the illumination light emitted from the emission end face 11*b*.

The piezoelectric elements 14 each include a physically formed identifier, for identifying the polarization direction, on one end in the length direction (z-direction). In this embodiment, the identifier is configured by a cutout portion 16 formed by chamfering at a 45° angle relative to the electrode surface along a short side of the electrode surface to which positive voltage is applied when causing the piezoelectric element 14 to expand. The cutout portion 16 can, for example, be formed simultaneously when cutting the piezoelectric element 14 with a dicing saw from a piezoelectric substrate that has undergone polarization treatment and an electrode formation process. Accordingly, the cutout portion 16 can be formed easily.

The piezoelectric elements 14 are each mounted on the ferrule 12 with the cutout portion 16 positioned at the emission end face 11*b* side of the optical fiber 11 held by the ferrule 12 (i.e. towards the tip of the ferrule 12). In this embodiment, in order for the piezoelectric elements 14*xa*, 14*xb* to vibrate the emission end 11*a* of the optical fiber 11 via the ferrule 12 by application of the in-phase alternating voltage for x-driving, the piezoelectric elements 14*xa*, 14*xb* are mounted so that the polarization directions with respect to the ferrule 12 are opposite each other. In other words, the piezoelectric element 14*xa* is mounted so that the surface on the opposite side from the surface having the cutout portion 16 is mounted on the ferrule 12, whereas the piezoelectric element 14*xb* is mounted so that the surface having the cutout portion 16 is mounted on the ferrule 12. Similarly, in order for the piezoelectric elements 14*ya*, 14*yb* to vibrate the emission end 11*a* of the optical fiber 11 via the ferrule 12 by application of the in-phase alternating voltage for y-driving, the piezoelectric elements 14*ya*, 14*yb* are mounted so that the polarization directions with respect to the ferrule 12 are opposite each other. In other words, the piezoelectric element 14*ya* is mounted so that the surface on the opposite side from the surface having the cutout portion 16 is mounted on the ferrule 12, whereas the piezoelectric element 14*yb* is mounted so that the surface having the cutout portion 16 is mounted on the ferrule 12.

Figure 2:
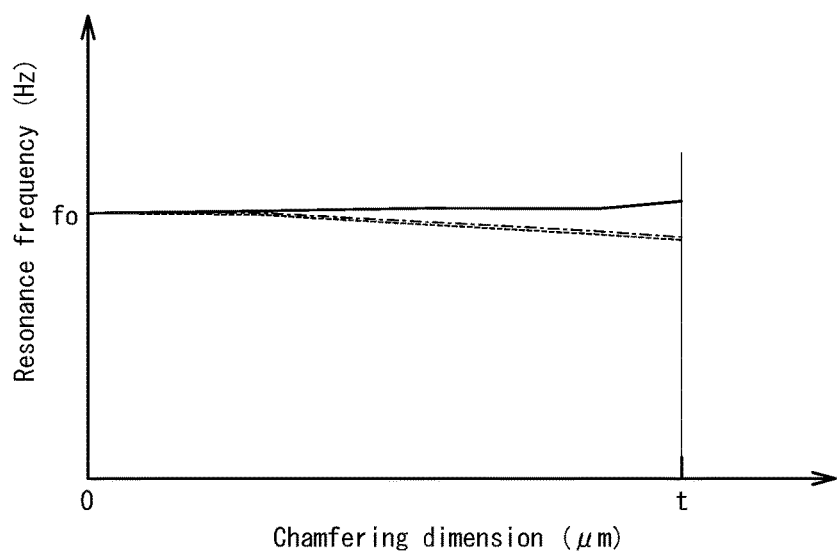
FIG. 2 illustrates experiment results on the resonance frequency characteristics of the optical fiber relative to the chamfering dimension of the cutout portion formed on the piezoelectric element.
Figure 3:
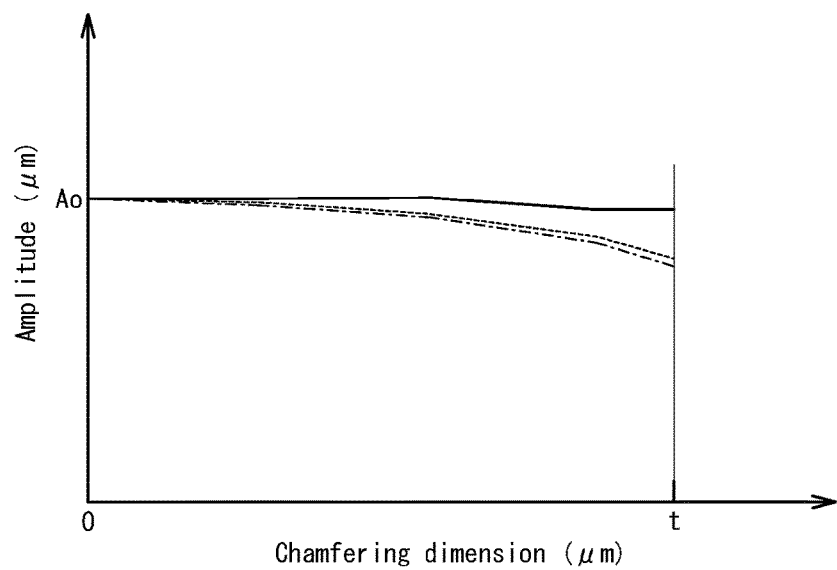
FIG. 3 illustrates experiment results on the amplitude characteristics of the optical fiber relative to the chamfering dimension of the cutout portion formed on the piezoelectric element.
Figure 4A:
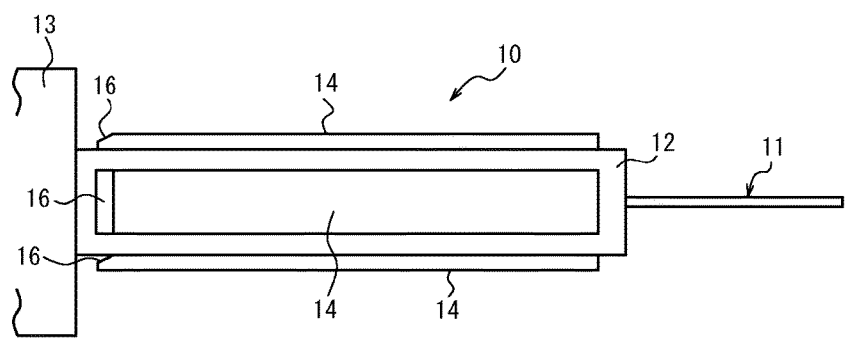
FIG. 4A schematically illustrates the configuration of the optical scanning actuator used in the experiments in FIG. 2 and FIG. 3.
Figure 4B:
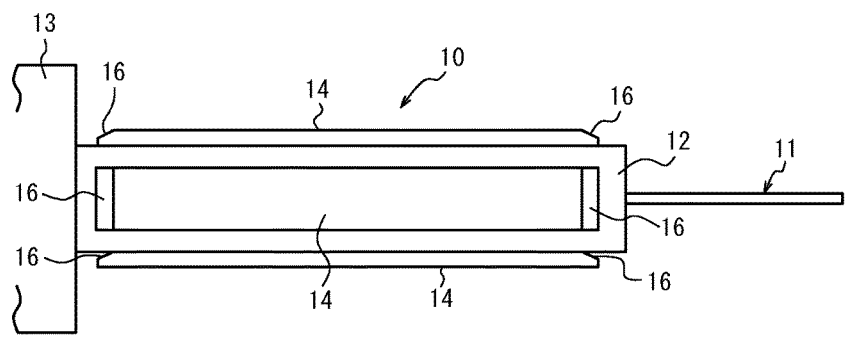
FIG. 4B schematically illustrates the configuration of the optical scanning actuator used in the experiments in FIG. 2 and FIG. 3.
Figure 5:
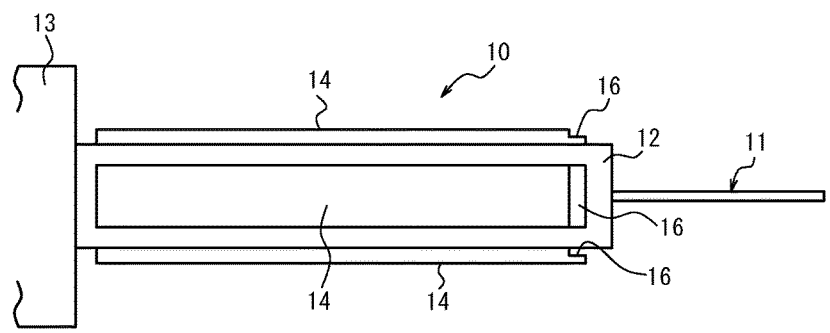
FIG. 5 illustrates Modification 1 to an optical scanning actuator according to Embodiment 1.

FIG. 2 illustrates experiment results on the resonance frequency characteristics of the optical fiber 11 relative to the chamfering dimension of the cutout portion 16 in the optical scanning actuator 10 according to this embodiment. FIG. 3 similarly illustrates experiment results on the amplitude characteristics of the optical fiber 11 relative to the chamfering dimension of the cutout portion 16 according to the optical scanning actuator 10. FIG. 2 and FIG. 3 also illustrate the experiment results when the piezoelectric elements 14 are mounted on the ferrule 12 with the cutout portion 16 positioned on the support 13 side (towards the base of the ferrule 12), as illustrated in FIG. 4A, and the experiment results when piezoelectric elements 14 having the cutout portion 16 formed at both ends in the z-direction are mounted on the ferrule 12, as illustrated in FIG. 4B. In FIG. 2 and FIG. 3, the solid line indicates the characteristics of the optical scanning actuator 10 according to this embodiment, in which the cutout portion 16 is positioned towards the tip of the ferrule 12, the dashed line indicates the characteristics in the case of FIG. 4A, and the dashed dotted line indicates the characteristics in the case of FIG. 4B. In FIG. 2 and FIG. 3, the horizontal axis indicates the chamfering dimension (μm), and t indicates the thickness of the piezoelectric elements 14 (100 μm or less).

In FIG. 2, the resonance frequency $f_O$ (Hz) indicates the resonance frequency in the case of no cutout portion 16 being formed on the piezoelectric element 14, i.e. the case of C=0. In FIG. 3, the amplitude $A_O$ (μm) similarly indicates the maximum amplitude when applying driving voltage with a predetermined amplitude to the piezoelectric elements 14 in the case of no cutout portion 16 being formed on the piezoelectric elements 14, i.e. the case of C=0.

As is clear from FIG. 2, when the cutout portion 16 of the piezoelectric elements 14 is positioned towards the tip of the ferrule 12, the resonance frequency increases as the chamfering dimension is greater. The rate of increase, however, is extremely small. Even when C=t, i.e. if an amount equal to the thickness of the piezoelectric element 14 is chamfered, then the rate of increase is approximately 0.1% when, for example, $f_O$ is 10 KHz or less. As is clear from FIG. 3, when the cutout portion 16 of the piezoelectric elements 14 is positioned towards the tip of the ferrule 12, the amplitude decreases as the chamfering dimension is greater. The rate of decrease, however, is extremely small. Even when chamfering so that C=t, then the rate of decrease is approximately 1% when, for example, $A_0$ is 500 μm or more.

When the cutout portion 16 of the piezoelectric elements 14 is positioned towards the base of the ferrule 12, the resonance frequency decreases as the chamfering dimension is greater. The rate of decrease, however, is extremely small. Even when chamfering so that C=t, then the rate of decrease is, for example, approximately 0.5% of $f_0$. When the cutout portion 16 of the piezoelectric elements 14 is positioned towards the base of the ferrule 12, the amplitude decreases as the chamfering dimension is greater. The rate of decrease, however, is extremely small. Even when chamfering so that C=t, then the rate of decrease is, for example, approximately 7% of $A_0$.

Similarly, when the cutout portion 16 is formed at both z-direction ends of the piezoelectric elements 14, the resonance frequency decreases as the chamfering dimension is greater. The rate of decrease, however, is extremely small. Even when chamfering so that C=t, then the rate of decrease is, for example, approximately 0.4% of $f_0$. When the cutout portion 16 is formed on both ends of the piezoelectric elements 14, the amplitude decreases as the chamfering dimension is greater. The rate of decrease, however, is extremely small. Even when chamfering so that C=t, then the rate of decrease is, for example, approximately 9% of $A_0$.

As is clear from FIG. 2 and FIG. 3, even if the cutout portion 16 is formed at the z-direction end of the piezoelectric elements 14, there is nearly no effect on the performance (resonance frequency, amplitude) as an optical scanning actuator. In particular, the cutout portion 16 of the piezoelectric elements 14 is preferably positioned towards the tip of the ferrule 12 as in this embodiment, since doing so reduces the performance degradation as compared to the case of the cutout portion 16 of the piezoelectric elements 14 being positioned towards the base of the ferrule 12, as illustrated in FIG. 4A, and the case of the cutout portion 16 being formed on both z-direction ends of the piezoelectric elements 14, as illustrated in FIG. 4B.

According to this embodiment, the piezoelectric elements 14 each have a cutout portion 16 formed by chamfering, constituting an identifier for identifying the polarization direction, along a short side at one end in the length direction (direction of expansion and contraction). Therefore, the polarization direction of the piezoelectric elements 14 can be identified easily without needing to confirm the electrical characteristics of the piezoelectric elements 14 in advance. Accordingly, the piezoelectric elements 14 can easily be mounted correctly on the ferrule 12, thereby improving the yield and assembly efficiency of the optical scanning actuator 10.

Figure 6:
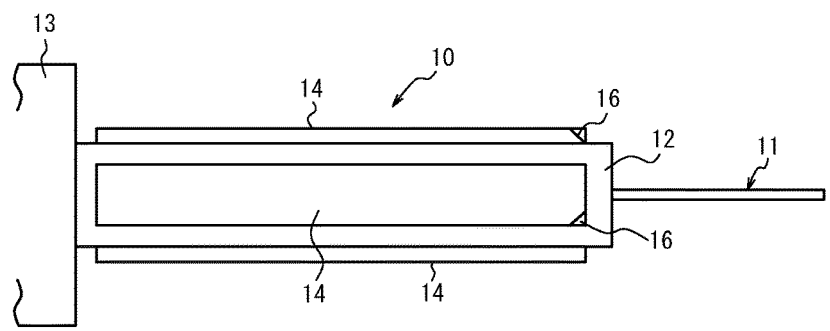
FIG. 6 illustrates Modification 2 to an optical scanning actuator according to Embodiment 1.
Figure 7:
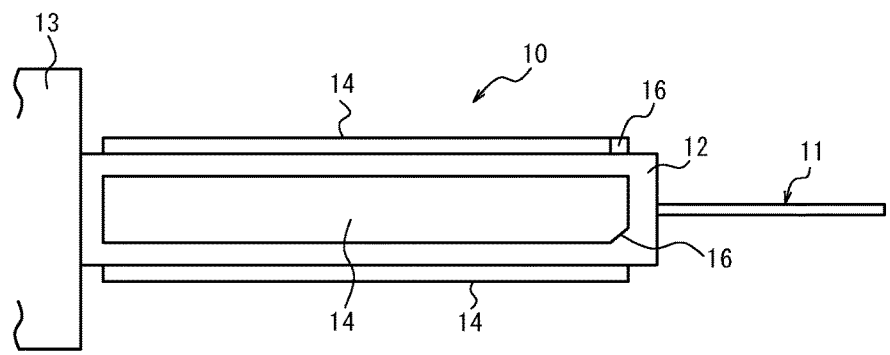
FIG. 7 illustrates Modification 3 to an optical scanning actuator according to Embodiment 1.
Figure 8:
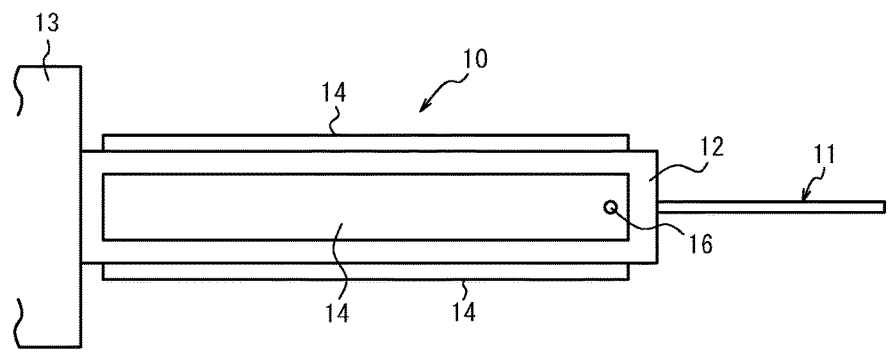
FIG. 8 illustrates Modification 4 to an optical scanning actuator according to Embodiment 1.

The cutout portion 16 is not limited to the case of being formed along the short side at one end in the direction of expansion and contraction of the piezoelectric element 14. For example, as illustrated in Modification 1 in FIG. 5, the cutout portion 16 may be formed stepwise along the short side at one end of the piezoelectric element 14. As illustrated in Modification 2 in FIG. 6, the cutout portion 16 may also be formed by chamfering the corner at one end of the piezoelectric element 14. Alternatively, as illustrated in Modification 3 in FIG. 7, the cutout portion 16 may be formed by removing a corner at one end of the piezoelectric element 14. As illustrated in Modification 4 in FIG. 8, the cutout portion 16 may also be formed by boring a concavity into the central portion at one end of the piezoelectric element 14. In FIG. 6 and FIG. 7, the cutout portion 16 may be formed at both corners at one end. In FIGS. 5 to 8, the cutout portion 16 may be formed at the end of the piezoelectric element 14 towards the base of the ferrule 12 or at both ends of the piezoelectric element 14. In each of these cases, the polarization direction of the piezoelectric elements 14 can be easily identified with almost no effect on the performance of the piezoelectric elements 14. Accordingly, as in the cases of the configuration in FIG. 1A and FIG. 1B, the piezoelectric elements 14 can easily be mounted correctly on the ferrule 12, thereby improving the yield and assembly efficiency of the optical scanning actuator 10.

Embodiment 2

Figure 9:
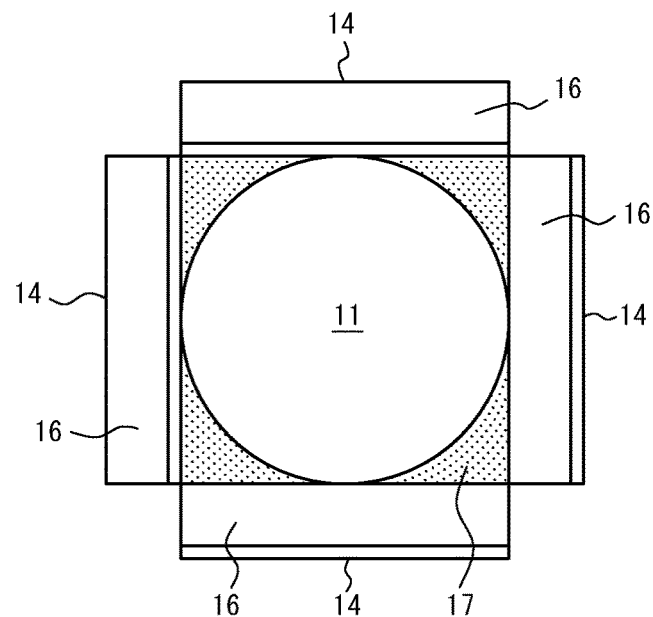
FIG. 9 schematically illustrates the configuration of the main part of an optical scanning actuator according to Embodiment 2.

FIG. 9 schematically illustrates the configuration of the main part of an optical scanning actuator according to Embodiment 2. The optical scanning actuator 10 according to this embodiment has the configuration of Embodiment 1, except that the four piezoelectric elements 14 are mounted directly on the emission end 11a of the optical fiber 11 by adhesive 17, without a ferrule therebetween. In other words, four piezoelectric elements 14 are joined directly to the emission end 11a of the optical fiber 11. The electrodes on the sides of the four piezoelectric elements 14 adhered to the optical fiber 11 are connected to each other as a common electrode. The optical fiber 11 is joined to the support 13 (see FIG. 1A) directly or via a ferrule at a location in the opposite direction than the emission end face 11b from the portion where the piezoelectric elements 14 are mounted, so that the emission end 11a is supported to allow oscillation. FIG. 9 illustrates piezoelectric elements 14 in which the cutout portion 16 illustrated in FIG. 1A and FIG. 1B is formed, but piezoelectric elements 14 having the other cutout portions 16 described in Embodiment 1 formed thereon may be mounted instead.

According to this embodiment, when mounting the piezoelectric elements 14 on the emission end 11a of the optical fiber 11, the polarization direction of the piezoelectric elements can be identified easily, thereby allowing the piezoelectric elements 14 to be easily mounted correctly on the emission end 11a. Accordingly, the yield and assembly efficiency of the optical scanning actuator 10 can be improved.

Figure 10:
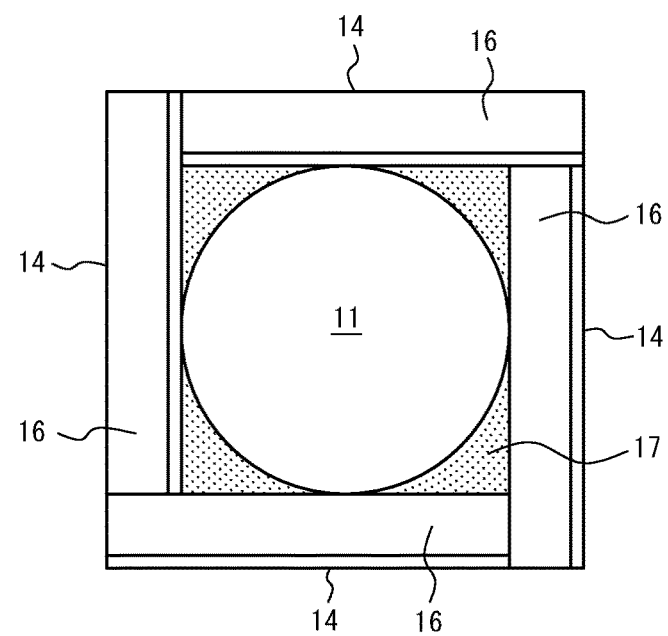
FIG. 10 illustrates a modification to an optical scanning actuator according to Embodiment 2.

The piezoelectric elements 14 may be mounted so that one side extending in the length direction is positioned at the optical fiber adhering side of an adjacent piezoelectric element 14, as illustrated in the modification in FIG. 10. This configuration can improve the ease of assembly.

Embodiment 3

Figure 11:
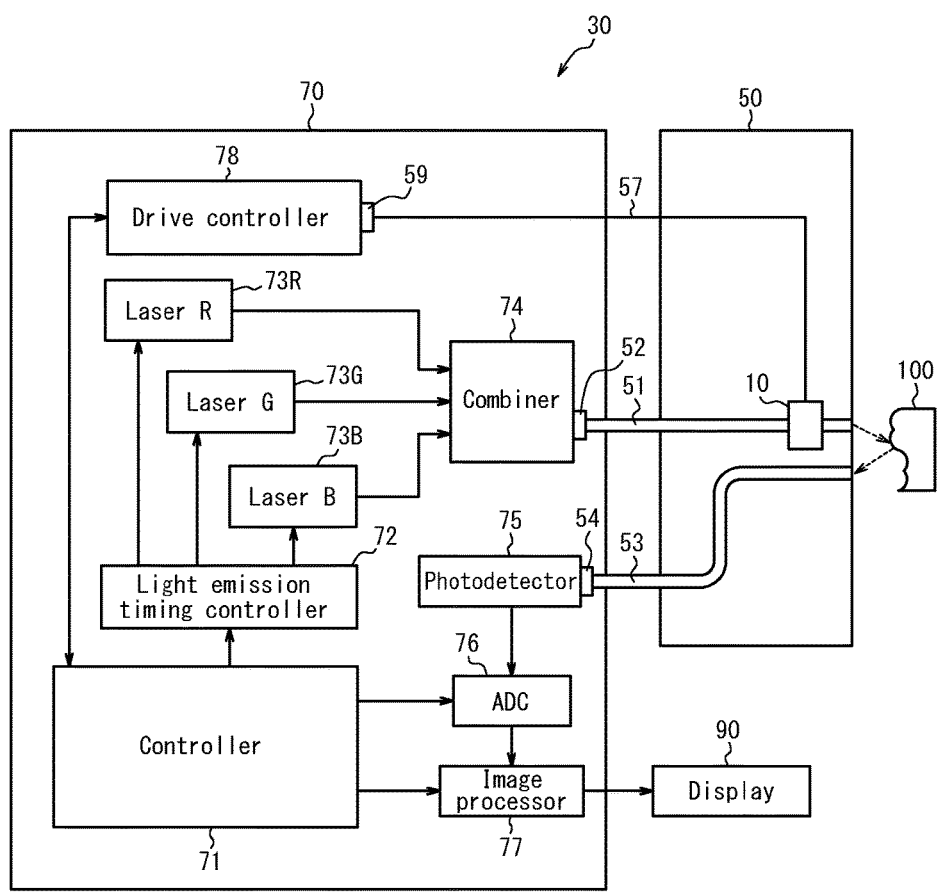
FIG. 11 schematically illustrates the configuration of the main part of an optical scanning apparatus according to Embodiment 3.

FIG. 11 schematically illustrates the configuration of the main part of an optical scanning apparatus according to Embodiment 3. The optical scanning apparatus according to this embodiment constitutes an optical scanning endoscope apparatus 30. The optical scanning endoscope apparatus 30 includes a scope (endoscope) 50, a control device body 70, and a display 90.

The control device body 70 includes a controller 71 that controls the optical scanning endoscope apparatus 30 overall, a light emission timing controller 72, lasers 73R, 73G, and 73B that constitute a light source, and a combiner 74. The laser 73R emits red laser light, the laser 73G emits green laser light, and the laser 73B emits blue laser light. Under the control of the controller 71, the light emission timing controller 72 controls the light emission timing of the three lasers 73R, 73G, and 73B. For example, Diode-Pumped Solid-State (DPSS) lasers or laser diodes may be used as the lasers 73R, 73G, and 73B. The laser light emitted from the lasers 73R, 73G, and 73B is combined by the combiner 74 and is incident as white illumination light on an optical fiber 51 for illumination, which is formed by a single-mode fiber. The combiner 74 may, for example, be configured to include a dichroic prism or the like. The configuration of the light source in the optical scanning endoscope apparatus 30 is not limited to this example. A light source with one laser may be used, or a plurality of other light sources may be used. The light source may be stored in a housing that is separate from the control device body 70 and is joined to the control device body 70 by a signal wire.

The optical fiber 51 for illumination corresponds to the optical fiber 11 described in Embodiment 1 and Embodiment 2 and extends to the tip of the scope 50. The optical fiber 51 for illumination includes an optical input interface 52 formed for example by an optical connector joined to the incident end. The optical input interface 52 is detachably joined to the light source (the combiner 74 in FIG. 11) and causes illumination light from the light source to enter the optical fiber 51 for illumination. Illumination light entering the optical fiber 51 for illumination is guided to the tip of the scope 50 and irradiated towards an object 100. At this time, the emission end of the optical fiber 51 for illumination is subjected to vibration driving by the optical scanning actuator 10 described in Embodiment 1 and Embodiment 2. Specifically, driving of the optical scanning actuator 10 is controlled by the below-described drive controller 78 of the control device body 70 so that the illumination light irradiated on the object 100 traverses a desired 2D scanning trajectory. As a result, the observation surface of the object 100 is scanned in 2D by illumination light emitted from the optical fiber 51 for illumination. Signal light, such as reflected light, scattered light, fluorescent light, and the like obtained from the object 100 by irradiation with illumination light is incident on the end face of an optical fiber bundle 53 for detection, which is formed by multi-mode fibers extending inside the scope 50, and the signal light is then guided to the control device body 70.

The control device body 70 further includes a photodetector 75 for processing signal light, an analog/digital converter (ADC) 76, an image processor 77, and a drive controller 78. The photodetector 75 divides the signal light optically guided by the optical fiber bundle 53 for detection into spectral components and converts the spectral components into electric signals with a photodiode or the like. The optical fiber bundle 53 for detection includes an optical output interface 54 formed for example by an optical connector joined to the emission end. The optical output interface 54 is detachably joined to the photodetector 75 and guides signal light from the object 100 to the photodetector 75. The ADC 76 converts the analog electric signals output from the photodetector 75 into digital signals and outputs the digital signals to the image processor 77. Based on information such as the amplitude, phase, and the like of vibration voltage applied by the drive controller 78, the controller 71 calculates information on the scanning position along the scan path of laser illumination light and provides the information to the image processor 77. The image processor 77 sequentially stores pixel data (pixel values) of the object 100 in a memory based on the digital signals output by the ADC 76 and the scanning position information from the controller 71. After completion of scanning or during scanning, the image processor 37 generates an image of the object 100 by performing image processing, such as interpolation, as necessary and displays the image on the display 90.

In the above-described processing, the controller 71 synchronously controls the light emission timing controller 72, the photodetector 75, the drive controller 78, and the image processor 77.

Figure 12:
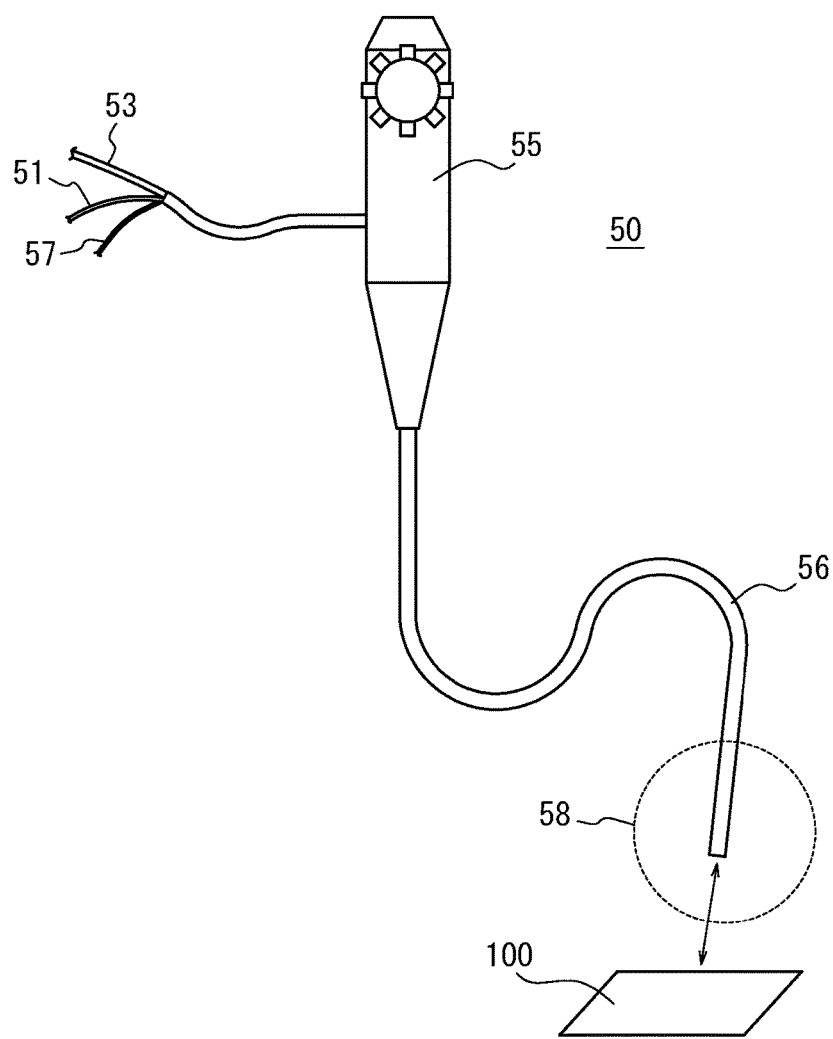
FIG. 12 is a schematic overview of the scope in FIG. 11.

FIG. 12 is a schematic overview of the scope 50. The scope 50 includes an operation part 55 and an insertion part 56. The optical fiber 51 for illumination, the optical fiber bundle 53 for detection, and wiring cables 57 are each detachably connected to the control device body 70 and extend from the operation part 55 to the tip 58 of the insertion part 56 (the portion indicated by the dashed line in FIG. 12). The wiring cables 57 include four lead wires connected respectively to the above-described four piezoelectric elements 14 that constitute the optical scanning actuator 10 and a lead wire connected to a common electrode. The wiring cables 57 are connected detachably to the drive controller 78 via a connector 59, as illustrated in FIG. 11.

Figure 13:
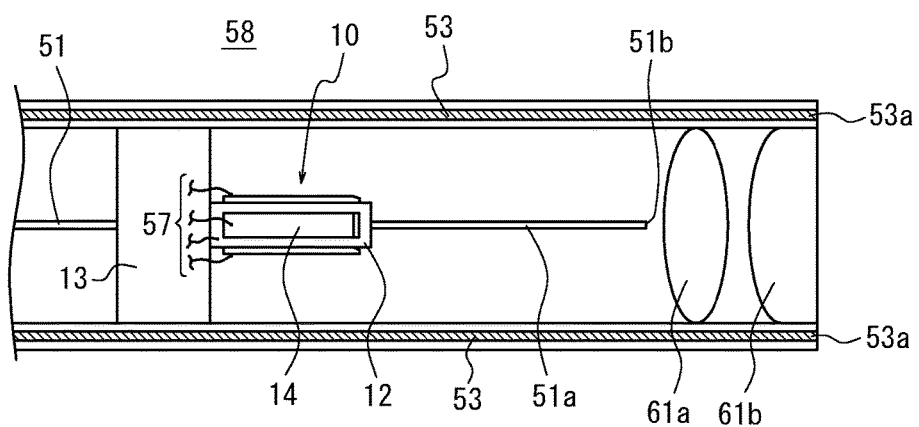
FIG. 13 is a cross-sectional diagram illustrating an enlargement of the tip of the scope in FIG. 12.

FIG. 13 is a cross-sectional diagram illustrating an enlargement of the tip 58 of the scope 50 in FIG. 12. The tip 58 is configured to include the optical scanning actuator 10, projection lenses 61a, 61b that form an illumination optical system, the optical fiber 51 for illumination that passes through the central portion of the scope 50, and the optical fiber bundle 53 for detection that passes through the outer peripheral portion of the scope 50.

The optical scanning actuator 10 has the configuration described in either Embodiment 1 or Embodiment 2. In this embodiment, for the sake of convenience, the optical scanning actuator 10 with the configuration illustrated in FIG. 1A and FIG. 1B is provided. The optical scanning actuator 10 is configured to include the ferrule 12, supported by the support 13 at one end in the insertion part 56 of the scope 50, and the four piezoelectric elements 14 mounted on the four outer sides of the ferrule 12. The optical fiber 51 for illumination is supported by the ferrule 12, and the emission end 11a can oscillate integrally with the ferrule 12. The optical fiber bundle 53 for detection is disposed to pass through the peripheral portion of the insertion part 56 and extend to the end of the tip 58. A non-illustrated detection lens may also be disposed at the tip 53a of each fiber in the optical fiber bundle 53 for detection.

The projection lenses 61a, 61b and the detection lenses are disposed at the extreme end of the tip 58. The projection lenses 61a, 61b are configured so that laser light emitted from an emission end face 51b of the optical fiber 51 for illumination is concentrated on a predetermined focal position. The detection lenses are disposed so that light that is reflected, scattered, refracted, or the like by the object 100 (light that interacts with the object 100), fluorescent light, or the like due to laser light irradiated on the object 100 is captured as signal light, concentrated on the optical fiber bundle 53 for detection disposed behind the detection lenses, and combined. The projection lenses are not limited to a double lens structure and may be structured as a single lens or as three or more lenses.

The optical scanning endoscope apparatus 30 according to this embodiment includes the optical scanning actuator 10 having the configuration described in either Embodiment 1 or Embodiment 2. Therefore, along with the improvement in the yield and assembly efficiency of the optical scanning actuator 10, the yield and assembly efficiency of the optical scanning endoscope apparatus 30 can be improved, thereby reducing costs.

According to the present disclosure, an optical scanning actuator and an optical scanning apparatus using the optical scanning actuator that can improve the yield and assembly efficiency can be provided.

The present disclosure is not limited to the above embodiments, and a variety of changes and modifications may be made. For example, the cutout portion 16 of the piezoelectric elements 14 that is yielded by chamfering is not limited to chamfering at 45° relative to the electrode surface and may be formed by chamfering at any angle. Also, the identifier of the polarization direction of the piezoelectric elements 14 is not limited to the cutout portion 16 and may be formed physically by an electrode pattern on the electrode surface of the piezoelectric element 14.

In the optical scanning endoscope apparatus 30 illustrated in FIG. 11, the optical fiber 51 for illumination displaced by the optical scanning actuator 10 is not limited to a single-mode optical fiber and may be a multi-mode fiber. Furthermore, the optical scanning apparatus according to the present disclosure is not limited to an optical scanning endoscope apparatus and may also be adopted in an optical scanning microscope or an optical scanning projector. The present disclosure may also be effectively applied when displacing an optical fiber in a 1D direction by driving one piezoelectric element.

REFERENCE SIGNS LIST

10 Optical scanning actuator
11 Optical fiber
11a Emission end
11b Emission end face
12 Ferrule
13 Support
14, 14xa, 14xb, 14ya, 14yb Piezoelectric element
16 Cutout portion
30 Optical scanning endoscope apparatus
50 Scope
51 Optical fiber for illumination
52 Optical input interface
70 Control device body
71 Controller
73R, 73G, 73B Laser
74 Combiner
78 Drive controller

The invention claimed is:

1. An optical scanning actuator comprising: a piezoelectric element joined to a displaceably supported emission end of an optical fiber and configured to displace the emission end in a direction perpendicular to an optical axis direction of the optical fiber by expanding and contracting in the optical axis direction; wherein the piezoelectric element has an elongated shape in the optical axis direction of the optical fiber; wherein the piezoelectric element comprises a cutout portion formed towards the emission end of the optical fiber.

2. The optical scanning actuator of claim 1, wherein the piezoelectric element is mounted on a side of a ferrule holding the optical fiber.

3. An optical scanning apparatus comprising:
an optical fiber with a displaceably supported emission end;
the optical scanning actuator of claim 1, the optical scanning actuator displacing the emission end;
an optical input interface configured to cause illumination light from a light source to enter the optical fiber; and
an illumination optical system configured to irradiate the illumination light emitted from an emission end of the optical fiber onto an object;
wherein the optical scanning apparatus performs a scan by controlling voltage applied to the piezoelectric element so that the illumination light irradiated onto the object traces a desired scanning trajectory.

4. The optical scanning actuator of claim 1, wherein the cutout portion comprises a chamfer along an edge of the piezoelectric element, the edge perpendicular to the optical axis direction.

5. The optical scanning actuator of claim 4, wherein chamfer is at a 45° angle relative to a surface of the piezoelectric element, the surface extending along the optical axis direction.

6. The optical scanning actuator of claim 1, wherein cutout portion comprises a stepwise shape along an edge of the piezoelectric element, the edge perpendicular to the optical axis direction.

7. The optical scanning actuator of claim 1, wherein cutout portion comprises a chamfered corner of an edge of the piezoelectric element, the edge perpendicular to the optical axis direction.

8. The optical scanning actuator of claim 1, wherein cutout portion comprises a bored concavity of a central portion of a surface of the piezoelectric element, the surface extending along the optical axis direction.

* * * * *